United States Patent
Wils et al.

(10) Patent No.: US 6,397,260 B1
(45) Date of Patent: May 28, 2002

(54) AUTOMATIC LOAD SHARING FOR NETWORK ROUTERS

(75) Inventors: Joris Johannes Maria Wils, Acton; James Scott Hiscock, Rockport; William Daniel Townsend, Groton, all of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/264,473

(22) Filed: Mar. 8, 1999

(51) Int. Cl.[7] .............................................. G06F 15/173
(52) U.S. Cl. ..................... 709/238; 709/245; 709/200; 370/401
(58) Field of Search ................................ 709/200, 240, 709/241, 238, 239, 245, 105, 226, 227; 455/432, 403, 422, 427; 370/219, 220, 396, 397, 352, 395, 389, 351, 390, 392, 401, 409

(56) References Cited

U.S. PATENT DOCUMENTS

| | | | | |
|---|---|---|---|---|
| 4,760,572 A | * | 7/1988 | Tomikawa | 370/390 |
| 5,473,599 A | * | 12/1995 | Li et al. | 370/219 |
| 5,917,820 A | * | 6/1999 | Rekhter | 370/392 |
| 5,949,788 A | | 9/1999 | Friedman et al. | 370/431 |
| 6,006,090 A | * | 12/1999 | Coleman et al. | 455/432 |
| 6,101,616 A | * | 8/2000 | Joubert et al. | 714/11 |
| 6,189,042 B1 | * | 2/2001 | Keller-Tuberg | 709/238 |
| 6,195,705 B1 | * | 2/2001 | Leung | 709/245 |
| 6,249,820 B1 | * | 6/2001 | Dobbins et al. | 709/238 |

OTHER PUBLICATIONS

Knight et al., "Request for Comments: 2338" The Internet Society Apr., 1998.
Jeffree T., "IEEE Standards for Local and Metropolitan Area Network" Contribution to the Apr. 1996 Link Aggregation Interim Meeting, Apr. 1998.

* cited by examiner

Primary Examiner—Zarni Maung
Assistant Examiner—Wen-Tai Lin
(74) Attorney, Agent, or Firm—Weingarten, Schurgin, Gagnebin & Lebovici LLP

(57) ABSTRACT

A network is operated such that message forwarding traffic is shared among routers in a load-sharing set. The routers are respectively associated with different non-overlapping subspaces of a source address space from which source addresses of source nodes on the network are drawn, and each router has an identifier uniquely identifying the router in the load-sharing set. Address request messages identifying a predetermined forwarding route are broadcast on the network by source nodes, each request message containing a source address of the broadcasting node. In response to each address request message, each router determines whether the source address is within the address subspace associated with the router, and if so returns the router's identifier to the source node. When a message is to be transmitted from a source node to a destination node on another network via a router, the source node transmits the message on the network along with the identifier returned in response to the address request message broadcast by the source node. Each router forwards only those messages that contain the router's identifier.

11 Claims, 4 Drawing Sheets

AUTOMATIC LOAD SHARING FOR NETWORK ROUTERS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of data communications networks, and in particular to routers in data communications networks that are responsible for forwarding data messages along routing paths from source to destination network nodes.

As the use of computer networks has expanded, there has been an increased need for dependability in network operation. One way in which increased dependability has been achieved is through redundancy. Thus for example it is known to provide one or more backup routers whose function is to take the place of a primary router if it should fail. While such redundancy is desirable from the viewpoint of network dependability, it can also lead to reduced efficiency if not intelligently exploited. Where previously one or more primary routers were employed, a larger number of routers are used in order to provide the desired backup capability. As a general matter, it is not desirable for an expensive network device such as a router to be idle for extended periods, because network operating costs are increased. Thus it is a goal of network operators to find efficient ways of introducing redundancy, so as to increase network dependability without unduly harming operating efficiency.

One way in which greater efficiency has been achieved is to implement load sharing, a technique which forces routing traffic to be distributed among a number of routers. Load sharing between routers has been known. For example, in the routing protocol OSPF routing choices depend in part on the loading at candidate next hop routers. However, OSPF is a complicated protocol that is not suitable for use by hosts or end-stations.

One way in which load sharing has been achieved in the Internet is through the configuring of so-called "default routers". A default router is a router to which a source node may send messages intended for a destination that is not directly reachable by the source. For example, the intended destination may be a node on a different subnetwork from the subnetwork on which the source node resides. The source node sends the message to the router at the default router address, and the router in turn forwards the packet toward the destination node using known techniques. Load sharing is achieved by attaching two or more routers to the network, and configuring different source nodes on a network with different default router addresses. In such a case each router handles only the portion of the overall forwarding workload that is generated by the source nodes configured with that router's address as the default router address.

The load-sharing scheme described above is static in nature, and requires the active participation of a network manager to configure the different default router addresses. The process is time consuming and error-prone. Also, the configuration may become invalid if a router becomes unavailable, for example due to hardware malfunction. Thus the network manager must monitor the validity of the load-sharing distribution in the face of changes in router availability, and must re-configure the default routers as necessary to maintain desired operational behavior.

Recently, a protocol referred to as Virtual Router Redundancy Protocol (VRRP) has been established in order to improve the availability of network routers and reduce the demand for active network management during operation. According to VRRP, routers operate either as Master or Backup for one or more abstractly-defined Virtual Routers. The Master router handles routing traffic in the usual manner. The Backup routers monitor the operation of the Master, and when the Master fails a Backup assumes the role of Master. A given physical router normally operates as Master of an associated Virtual Router, and operates as Backup for one or more other physical routers.

While redundancy schemes like VRRP address the issue of router availability, and thus can reduce the need for active network manager participation when a router fails, they do not address the problem of load sharing. Even when using VRRP, a network manager must manually configure the network nodes in a manner that is calculated to achieve a desired sharing of the forwarding load.

It would be desirable to achieve load sharing in a network without the need to manually configure default routers for the network nodes, to provide for more efficient operation and management of data communications networks.

BRIEF SUMMARY OF THE INVENTION

In accordance with the present invention, a method for sharing a message forwarding load is disclosed that does not require the manual configuration of different default routers to achieve the desired distribution of forwarding traffic. The method enables source network nodes to automatically configure themselves to direct forwarding traffic to different routers, improving the ease with which networks are managed.

In the disclosed method, two or more routers on a network are configured as a load-sharing set of routers. The address space of source nodes on the network is partitioned into multiple non-overlapping subspaces, and different routers in the load-sharing set are associated with different subspaces. Each router is configured with an identifier uniquely identifying the router in the load-sharing set. During operation, source nodes on the network broadcast address request messages, each message identifying a predetermined forwarding route and containing the source address of the broadcasting node. In response to each address request message, each router determines whether the source address in the message is within the address subspace associated with the router, and if so returns the router's identifier to the source node. Each source node maintains an association between the forwarding route and the identifier returned in response to its address request message.

When a data message is to be transmitted from a source node to a destination node on another network via a router, the source node transmits the message on the network along with the identifier returned in response to the address request message broadcast by the source node. Each router responds only to those messages that contain the router's identifier. The router responds by determining a suitable next hop node for the message and forwarding the message to the next hop node. In this manner the forwarding traffic being generated by the source nodes on the network is automatically distributed among the routers in the load-sharing set, once the source address space has been partitioned.

In one embodiment the load-sharing technique is used on the Internet. The forwarding route is identified by an Internet Protocol (IP) address, and the source nodes and routers employ the Address Resolution Protocol (ARP) to exchange address request and response messages. The source addresses examined by the routers are layer-2 addresses such as Ethernet Media Access Control (MAC) addresses, and the identifiers returned by the routers are used to form layer-2 addresses for the routers. The technique uses standard Internet protocols to achieve load sharing in an automatic fashion.

Other aspects, features, and advantages of the present invention are disclosed in the detailed description which follows.

DETAILED DESCRIPTION OF THE INVENTION

Figure 1:
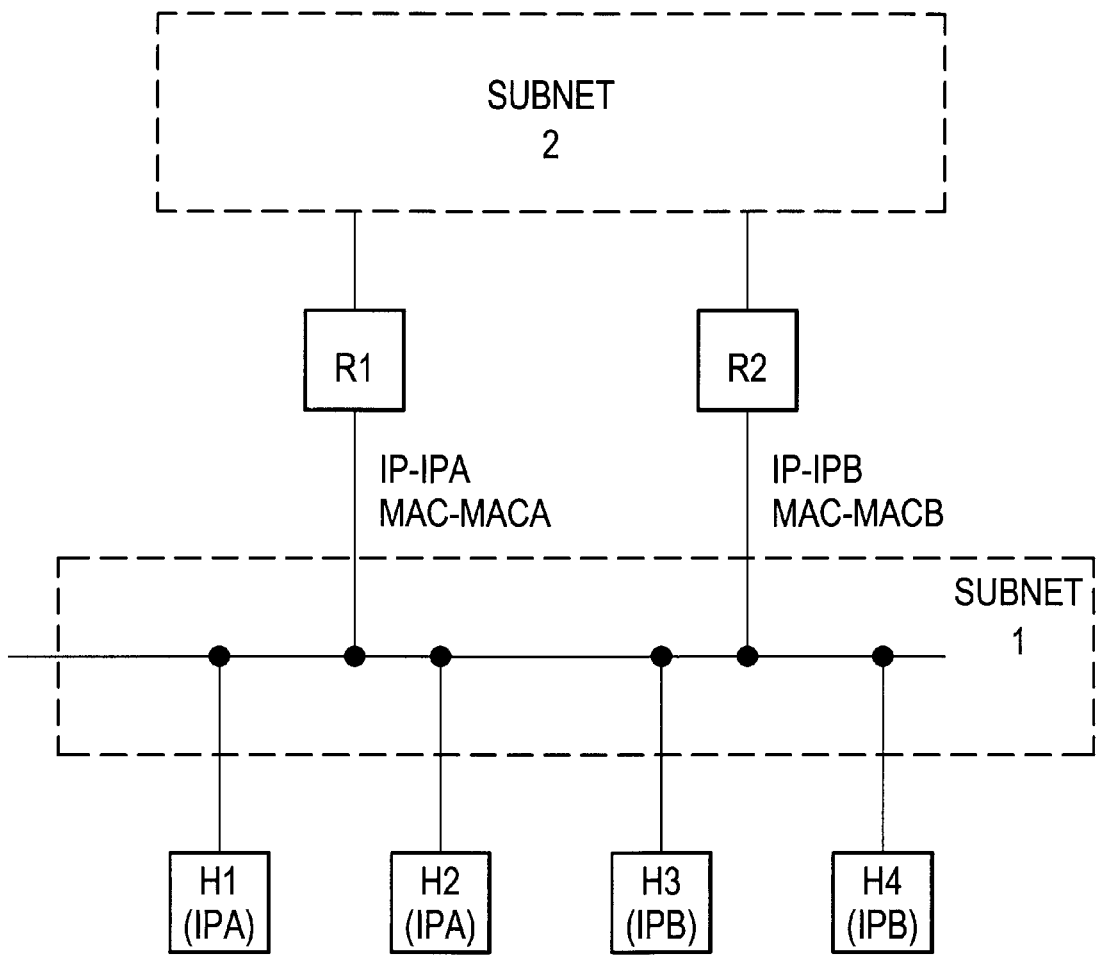
FIG. 1 is a block diagram of a network configured for load sharing in a prior-art manner.

FIG. 1 shows a prior-art technique that provides for load sharing of a packet forwarding load. In FIG. 1, a number of hosts H1, H2, H3 and H4 are connected to an IP subnetwork labelled SUBNET 1. Also connected to the subnetwork SUBNET 1 are two routers R1 and R2. Routers R1 and R2 are also connected to a second subnetwork labelled SUBNET 2. The subnetwork SUBNET 2 may have a relatively simple structure like that of subnetwork SUBNET 1, or it may be more complex. For example, the subnetwork SUBNET 2 may be a backbone network segment connecting the subnetwork SUBNET 1 with remote subnetworks not shown in FIG. 1.

As shown in FIG. 1, router R1 is assigned an IP address which is designated IPA, and router R2 is assigned a different IP address designated IPB. Also, router R1 is assigned a MAC address designated MACA, and router R2 is assigned a MAC address designated MACB. As is known in the art, these addresses are used in communication messages sent within the subnetwork SUBNET 1 to identify the respective router R1 or R2 as the source or destination of messages at different hierarchical layers of the network. Specifically, the IP address is associated with layer 3 of the Open Systems Interconnect (OSI) model, and the MAC address is associated with layer 2. Layer 3 is sometimes referred to as the "network layer", and layer 2 as the "data link layer".

In order to send messages to entities that may reside within or be accessible via the subnetwork SUBNET 2, each host H1–H4 establishes a "default router", which is the IP address of a router on the subnetwork SUBNET 1 that can forward packets to the subnetwork SUBNET 2. In FIG. 1, the default router for each host H1–H4 is indicated in parenthesis. Thus the default router for the hosts H1 and H2 is router R1, as indicated by the value (IPA) shown in connection with hosts H1 and H2, and the default router for hosts H3 and H4 is router R2, as indicated by the value (IPB) shown in connection with hosts H3 and H4.

Each host H1–H4 obtains the MAC addresses of other nodes in the subnetwork SUBNET 1 using a mechanism known as the Address Resolution Protocol (ARP). As necessary, each host broadcasts ARP requests, each containing the IP address of a node in SUBNET 1 whose MAC address is being sought. In response to each ARP request, the network node within SUBNET 1 having the indicated IP address returns an ARP response including its MAC address. As an example, host H1 issues an ARP request including the IP address IPA, and the router R1 returns an ARP response with the value MACA as the MAC address corresponding to the IP address IPA. Each node on the subnetwork SUBNET 1, including host H1, stores the association between the IP address IPA and the MAC address MACA in a data structure known as the ARP cache. These associations are refreshed periodically in a known fashion in order to maintain an accurate set of bindings between IP and MAC addresses.

When a packet is to be sent from a given host to a node residing within or accessible via the subnetwork SUBNET 2, the host creates an IP packet containing the IP address of the host as the source address and the IP address of the destination node as the destination address. The IP packet is transmitted using one or more layer-2 messages that each contains the MAC address of the sending host as the source address, and the MAC address of the default router as the destination address. Thus hosts H1 and H2, for example, create layer-2 messages having a destination address equal to MACA, which is the layer-2 address associated with the default router R1 for hosts H1 and H2. Similarly, hosts H3 and H4 use the value MACB as the destination address for layer-2 packets destined for the subnetwork SUBNET 2.

In a known fashion, each router R1 or R2, upon receipt of a packet having a destination address within the subnetwork SUBNET 2, consults a forwarding table in order to determine the layer-2 address of the next hop node. The receiving router then creates a new layer-2 encapsulation of the IP packet, and forwards the layer-2 message or messages to the next hop node indicated by the forwarding table. This process continues as necessary within and beyond the subnetwork SUBNET 2 until the IP packet reaches the desired destination node as indicated by the destination IP address.

In the scheme shown in FIG. 1, load sharing is achieved by configuring different hosts to use different default routers. The forwarding traffic is split between routers R1 and R2, with router R1 handling traffic generated by hosts H1 and H2, and router R2 handling traffic generated by hosts H3 and H4. This scheme has two significant drawbacks. The network manager must manually configure groups of hosts with different default routers to achieve load sharing, which is a time-consuming procedure. Also, if a router or an interface on a router should become unavailable, hosts must be re-configured with new default routers, again requiring the intervention of the network manager.

Figure 2:
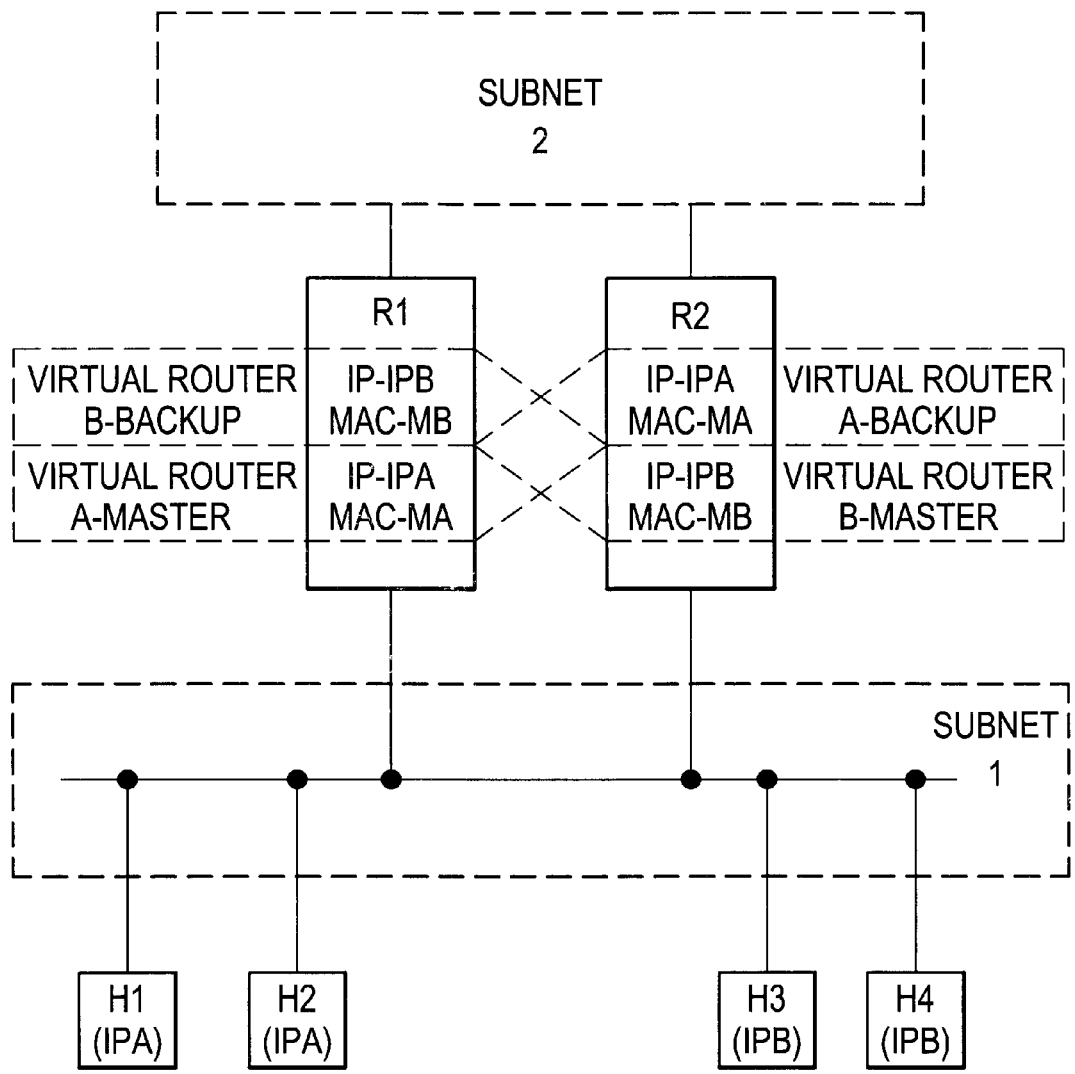
FIG. 2 is a block diagram of a network configured for backup redundancy according to the Virtual Router Redundancy Protocol (VRRP) and the prior-art load-sharing scheme of FIG. 1.

FIG. 2 shows a prior-art enhancement to the scheme of FIG. 1 that provides for backup redundancy among routers, so that operator intervention is not required to re-configure default routers when a router or interface becomes unavailable. The scheme employs abstract objects known as Virtual Routers, and an operating protocol known as the Virtual Router Redundancy Protocol (VRRP). Virtual Routers and VRRP are described in a document published by The Internet Society entitled "Request for Comments: 2338", which is referred to herein as RFC 2338.

In accordance with VRRP, the routers R1 and R2 are configured to implement two Virtual Routers, designated in FIG. 2 as Virtual Router A and Virtual Router B. Virtual Router A is associated with an IP address designated IPA and a MAC address MA, while Virtual Router B is associated with an IP address designated IPB and a MAC address MB. The IP addresses IPA and IPB are typically the IP addresses configured for the routers R1 and R2 for other, non-VRRP purposes, such as ICMP pings, TCP connections, etc., in which case each address IPA and IPB is said to be "owned" by the respective router R1 or R2. The MAC addresses MA and MB are not the same as the physical MAC addresses assigned to the routers R1 and R2 for ordinary purposes. Rather, the addresses MA and MB are special MAC addresses that are created and used in accordance with VRRP. Specifically, each MAC address MA and MB is derived from a unique Virtual Router Identifier (VRID) associated with the respective Virtual Router, as set forth in RFC 2338, and used in a manner described below.

As shown in FIG. 2, router R1 is the Master for Virtual Router A, while router R2 is a Backup for Virtual Router A. Similarly, router R2 is Master for Virtual Router B, while router R1 is a Backup for Virtual Router B. RFC 2338 specifies the manner in which a Master is selected during initialization and also during operation when a failed Master is to be replaced by a Backup. There may be more than two routers participating in a Virtual Router, in which case the single Master router is backed up by multiple Backup routers. The Backup routers are assigned different priorities for assuming Master status when necessary, as described in RFC 2338.

VRRP operates generally as follows. Each router that is to participate in a given Virtual Router (e.g. routers R1 and R2 in FIG. 2) is configured with a VRID, an IP address, a MAC address, and a priority. The VRID, IP address, and MAC address are shared among all routers participating in the Virtual Router. One router becomes Master of the Virtual Router, and the others become Backups, in a manner specified in RFC 2338. If a router owns the IP address associated with the Virtual Router, then that router becomes the Master of the Virtual Router by default upon initialization.

The Master router responds to ARP requests for the associated IP address by returning the MAC address configured for the Virtual Router. The Master receives all packets containing the MAC address of the Virtual Router, and forwards those received packets that are destined for another network (e.g. subnetwork SUBNET 2) as necessary. The Master also periodically broadcasts a VRRP Advertisement message to inform the other (Backup) routers that it is available.

Each Backup router monitors the VRRP Advertisements broadcast on the network in order to be aware of the Master's availability. If a Backup router determines that the Master's activity has ceased, it acquires the status of Master if its priority is higher than the other Backup routers for the Virtual Router. As described in RFC 2338, there is also a process by which a router relinquishes the status of Master to a higher-priority router, and reverts to Backup status.

Thus in the configuration shown in FIG. 2, router R1 responds to ARP requests for IP address IPA by returning the MAC address MA, and forwards all packets containing the MAC address MA to the appropriate next hop node in SUBNET 2. Router R2 performs the same functions for IP address IPB and MAC address MB. If either router R1 or R2 should become unavailable, the other router assumes the status of Master for that Virtual Router, in addition to having Master status on the other Virtual Router. Thus for example should router R2 fail, router R1 becomes responsible for responding to ARP requests for IP addresses IPA or IPB, and for forwarding packets containing MAC addresses MA or MB. One of the advantages of VRRP is transparency: it is not necessary for hosts to re-ARP when a default router fails. Each host continues to send packets to the same MAC address, and the packets are automatically received and forwarded by the Backup router that has become Master for the Virtual Router.

While the use of VRRP advantageously provides for the automatic transfer of responsibility for forwarding packets to a Backup router, the network manager still bears responsibility for distributing the forwarding load among multiple routers by configuring different default routers on different hosts. Also, it is necessary to keep the load balanced as network nodes are added and deleted. The process of configuring different default routers can be time consuming, especially on large networks. Also, once an overall load partitioning scheme has been established, the process of manually configuring each node to carry out the scheme is straightforward, and does not generally require the relatively high skill level of a network manager to accomplish.

Figure 3:
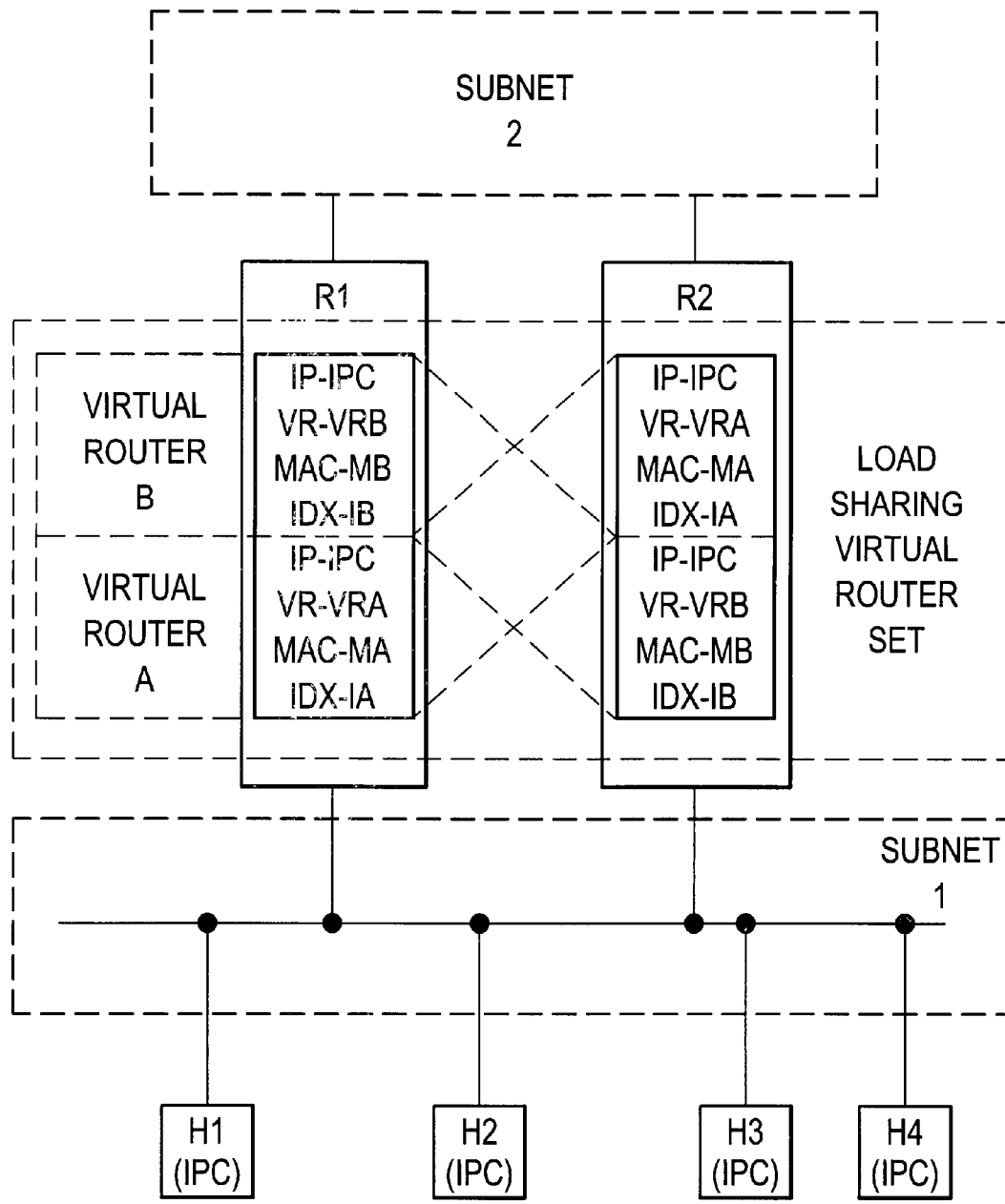
FIG. 3 is a block diagram of a network configured for load sharing in accordance with the present invention.

FIG. 3 illustrates a scheme that accomplishes automatic load sharing of forwarding traffic while retaining the improved availability benefits of VRRP. The routers R1 and R2 are configured to participate in multiple Virtual Routers. In FIG. 3 these are designated Virtual Router VRA and Virtual router VRB. At any given time, one router serves as Master for each Virtual Router, and the other router serves as Backup. Thus in the system of FIG. 3, for example, under ordinary operating circumstances router R1 is the Master for Virtual Router VRA, and router R2 is the Master for Virtual Router VRB.

All the Virtual Routers in a Load-Sharing Set are configured with a common IP address, which is different from the IP addresses configured at each node for non-VRRP purposes. In FIG. 3 this single shared IP address is designated IPC. Each host H1–H4 is configured to use the shared address IPC as a default router. Each Virtual Router within the set has a unique VRID; these are indicated as VRA and VRB in FIG. 3. Also, each Virtual Router has a unique virtual MAC address, these being indicated as MA and MB. Each Virtual Router is also configured with a unique index within the Load Sharing Set, these being indicated as values IA and IB in FIG. 3. The index values IA and IB are used in a manner described below to enable the routers R1 and R2 to selectively respond to ARP requests issued by the hosts H1–H4.

In operation, the system of FIG. 3 first establishes a Master for each Virtual Router. The VRRP protocol is followed, but dynamic behavior is generally different from the system of FIG. 2. In the scheme of FIG. 3, neither router R1 nor R2 "owns" the IP address IPC, and thus neither router attains Master status by virtue of such ownership. Upon initialization, both routers R1 and R2 initially act as Backup routers. After a period, the routers R1 and R2 realize that no VRRP Advertisements are being transmitted, indicating that no Master is present. The routers R1 and R2 respond by broadcasting their own Advertisements, and comparing the priorities of broadcast Advertisements with their configured priorities. The router having the highest configured priority for each Virtual Router assumes Master status for that Virtual Router, and the other router assumes Backup status.

Figure 4:
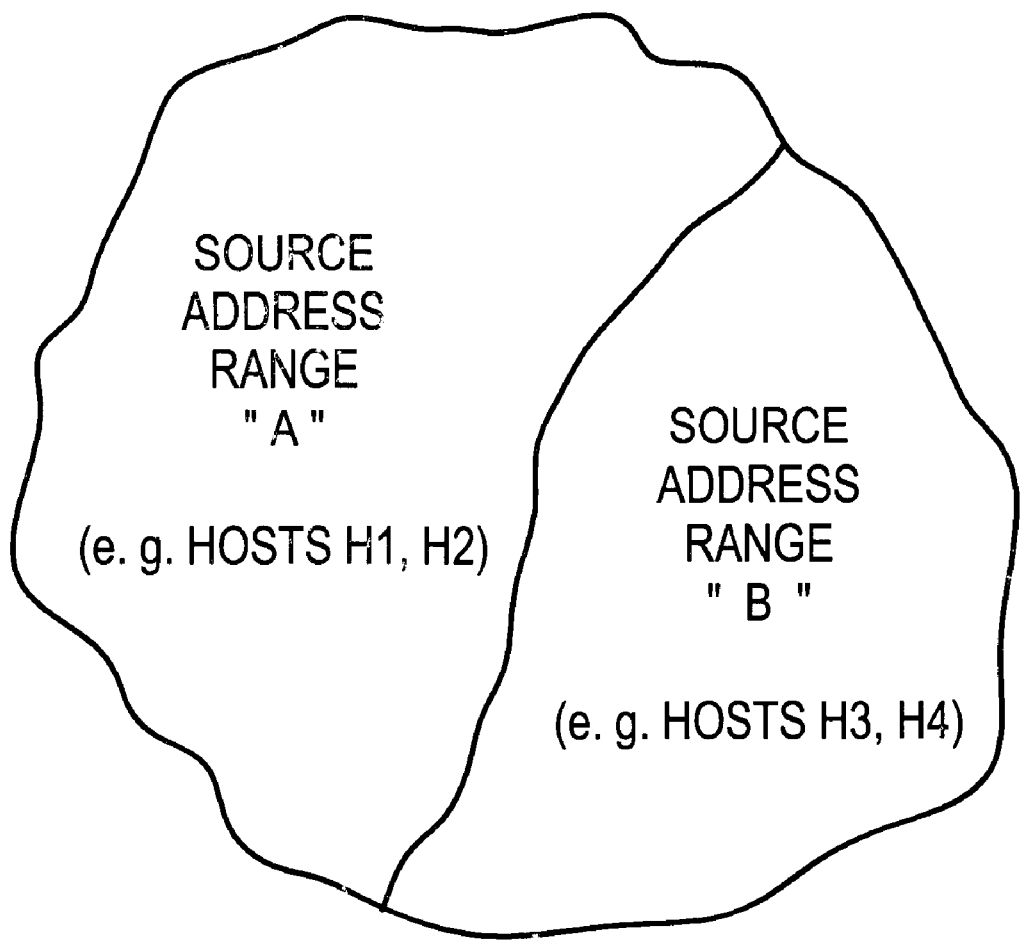
FIG. 4 is a schematic illustration of the partitioning of source address space in the network of FIG. 3.

In addition to the data items shown in FIG. 3, each Virtual Router within a Load Sharing Set is also configured with a selection function such as a hash table that maps source MAC addresses to the indices of the Virtual Routers within the load-sharing set in a predetermined manner. In this manner, the layer-2 source address space is divided into non-overlapping subspaces, as illustrated in FIG. 4. Each subspace is associated with a different Virtual Router within the set. The selection function to achieve this address space partitioning may be realized in any of a variety of known ways.

When one of the hosts H1–H4 issues an ARP request for IP address IPC, one of the routers R1 and R2 will respond according to the following algorithm. First, each router R1 and R2 examines the ARP request, acting as Master of a Virtual Router. In the illustrated case, router R1 acts as Master for Virtual Router VRA, and router R2 acts as Master for Virtual Router VRB. Each Master applies the selection function to the source MAC address in the ARP request. For example, if the selection function is a hash table, the Master looks up an index in the hash table using the source MAC address. If the result of applying the selection function is the index of the Virtual Router, (i.e., IA for VRA, IB for VRB), then the Master responds to the ARP request with the MAC address configured for the Virtual Router (i.e., MA for VRA, MB for VRB). If the result is not the index of the Virtual Router, then the router does not respond to the ARP request, because another router in the set is responsible for responding. Thus the MAC address returned to the requesting Host will differ depending on the host's MAC address.

As a result of the above algorithm, during operation the ARP caches of the different hosts H1–H4 contain different MAC address bindings for the IP address IPC. Thus data messages sent from the hosts H1–H4 to the default router contain either the MAC address MA for router R1 or MAC address MB for router R2, depending on the source of the message. The router acting as Master for Virtual Router VRA forwards only those messages containing MAC address MA, and the router acting as Master for Virtual Router VRB forwards only those messages containing MAC address MB. If for some reason one of the routers R1 or R2 becomes Master on both Virtual Routers, then that router handles all the forwarding traffic for both Virtual Routers. Under normal operating circumstances, however, each router serves as Master of a different Virtual Router in the Load Sharing Set, and so the forwarding load is shared among the routers in a desired manner.

While FIG. 3 illustrates a simplified embodiment in which only two routers participate in each Virtual Router and in a Load Sharing Set, the technique can be readily extended to larger groups of routers. The VRRP protocol, for example, provides for up to 255 virtual routers on a network, a sufficiently large number that is unlikely to be achieved in any real network. Also, as described below the load sharing technique can be used without backup redundancy, and thus is not necessarily constrained by the particulars of VRRP or other redundancy considerations.

It also may be desirable in alternative embodiments that the virtual routers hash on an address other than the source MAC address. For example, the source IP address may be employed.

In alternative embodiments, load sharing can be employed without backup redundancy if desired. For example, each physical router in a load-sharing set may be configured with a shared IP address, a unique MAC address and index, and a selection function, without the additional configuration data and functionality associated with Virtual Routers. Different layer-2 bindings for the shared IP address can be obtained using selective ARP responses as above, enabling the forwarding traffic to be directed to multiple routers. In such an embodiment, it would be necessary upon losing a router to reconfigure the remaining load-sharing routers to re-distribute the forwarding load, and it would be necessary for the hosts to re-ARP in order to receive updated layer-2 bindings.

The load-sharing techniques described herein are also adaptable to networks and network protocols other than IP and Ethernet. RFC 2338 describes operation of VRRP in FDDI and token-ring networks; the techniques described herein may be employed to also achieve automatic load sharing of forwarding traffic in such networks.

It will be apparent to those skilled in the art that modification to and variation of the above-described methods and apparatus are possible without departing from the inventive concepts disclosed herein. Accordingly, the invention should be viewed as limited solely by the scope and spirit of the appended claims.

What is claimed is:

1. A method of operating a router on a network, comprising the steps of:

maintaining information associating the router with an address subspace, the address subspace being one of a plurality of non-overlapping subspaces of a data link layer address space from which source addresses of source nodes on the network are drawn, each subspace being associated with a corresponding different router from among a set of load-sharing routers of which the router is a member;

in response to receiving from a source node on the network an address request message containing a common network layer address assigned to the routers of the load-sharing set, determining whether a data link layer source address included in the message is within the address subspace associated with the router, and if so then returning to the source node a data link layer address uniquely identifying the router among the routers in the load-sharing set, and otherwise refraining from returning a response to the source node; and in response to receiving data messages containing the uniquely-identifying data link layer address as a destination address and containing network-layer messages destined for network nodes on another network, determining a next hop destination node for each such network-layer message and forwarding the network-layer message to the determined next hop destination node.

2. A method according to claim 1, wherein the information maintained by the router includes an index uniquely identifying the router in the load-sharing set and a selection function operative to map the source addresses of the source nodes to respective indices of the routers in the load-sharing set.

3. A method according to claim 2, wherein the selection function comprises accessing a hash table with the source addresses.

4. A method according to claim 1, wherein the network address space is a data link layer address space, and wherein the step of determining whether the source address included in each address request message is within the address subspace associated with the router comprises the step of examining a data link layer source address contained within the address request message.

5. A method according to claim 1, wherein the address request message is an address resolution protocol (ARP) request message, and the common network layer address assigned to the routers of the load-sharing set is an Internet Protocol (IP) address.

6. A method according to claim 1, wherein the address request message is an address resolution protocol (ARP) request message, the common network layer address assigned to the routers of the load-sharing set is an Internet Protocol (IP) address, and the address uniquely identifying the router is a Media Access control (MAC) address.

7. A method according to claim 1, wherein the steps carried out in response to address request messages and data messages are carried out only if the router is a master of a virtual router defined among the load-sharing set of routers, the virtual router including only one master router and one or more backup routers, and further comprising the steps of:

attaining a status as master of the virtual router; and upon attaining master status for the virtual router, in addition to performing the steps carried out in response to address request messages, periodically transmitting messages to the backup routers in the load-sharing set indicating the availability of the master router for forwarding messages.

8. A method according to claim 7, further comprising the steps of (i) prior to attaining the status of master for the virtual router, maintaining a status as a backup of the virtual router while another router maintains the status of master, and (ii) while maintaining the status as a backup for the virtual router, monitoring activity of the master, router on the network to determine whether the master router is available for forwarding messages, and wherein the step of attaining status as a master is carried out in response to determining, while maintaining the status of a backup, that the master has become unavailable.

9. A method according to claim 8, farther comprising the steps of (i) while maintaining status of master for the virtual router, monitoring messages sent by other routers in order to determine if one of the other routers has a higher priority for master status for the virtual router, and (ii) relinquishing the status as master for the virtual router and reverting to the backup status if one of the other routers is determined to have a higher priority for master status.

10. A method of operating a network, comprising:

configuring a plurality of routers on the network as a load-sharing set collectively responsible for forwarding certain data messages from the network to another network, the data messages to be forwarded being associated with a predetermined forwarding route on the network, each router being configured with (i) information associating the router with a corresponding one of a plurality of non-overlapping subspaces of a data-link layer address space from which source addresses of a plurality of source nodes on the network are drawn, and (ii) a data link layer address uniquely identifying the router in the load-sharing set at a data link layer;

configuring each source node with a common network layer address identifying the load-sharing set of routers;

broadcasting address request messages from the source nodes on the network using the common network layer address, each address request message containing the source data link layer address of the broadcasting source node;

in each router, in response to receiving each broadcast address request message, determining whether the source address included in the message is within the address subspace associated with the router, and if so then returning the configured identifier to the broadcasting source node;

in each source node, when a message is to be transmitted to a destination node on the other network, transmitting the message on the network along with (i) the uniquely-identifying address as a data link layer destination address, and (ii) a network layer destination address identifying the destination node on the other network; and in each router, in response to receiving messages containing the uniquely-identifying address as a data link layer destination address and containing network-layer messages containing a network layer destination address identifying the destination node on the other network, determining a next hop destination node for the network-layer messages and forwarding the messages to the determined next hop destination node.

11. A method of configuring hosts on a data link with data link layer addresses of routers of a load-sharing set of routers to which the hosts are to send network-layer messages for forwarding to destination nodes, comprising:

assigning a common network-layer address to the routers;

configuring each router with information associating the router with a corresponding one of a plurality of non-overlapping subspaces of a data-link layer address space;

at each of the routers, selectively sending response messages to address request messages sent by the hosts and containing the common network layer address, each router sending a response message to an address request message if a source data-link layer address In the address request message falls within the address subspace associated with the router, and otherwise refraining from sending a response message, each response message including a data link layer address associated with the responding router; and at each host, upon receiving a response message from one of the routers, storing the data link layer address from the response message in association with the network layer address of the load-sharing set of routers, the stored data link layer address being used by the host to create data link layer messages including respective network-layer messages being sent to the associated router for forwarding to the destination nodes.

* * * * *

UNITED STATES PATENT AND TRADEMARK OFFICE
CERTIFICATE OF CORRECTION

PATENT NO.    : 6,397,260 B1
DATED         : May 28, 2002
INVENTOR(S)   : Joris Johannes Maria Wils et al.

It is certified that error appears in the above-identified patent and that said Letters Patent is hereby corrected as shown below:

Column 9,
Line 31, "farther" should read -- further --.

Signed and Sealed this

Fifth Day of August, 2003

JAMES E. ROGAN
*Director of the United States Patent and Trademark Office*